(12) United States Patent
Crawforth et al.

(10) Patent No.: US 6,728,067 B2
(45) Date of Patent: Apr. 27, 2004

(54) SLIDER HAVING INTEGRATED LAPPING GUIDES

(75) Inventors: Linden James Crawforth, San Jose, CA (US); Huey-Ming Tzeng, San Jose, CA (US); Xiao Wu, San Jose, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 49 days.

(21) Appl. No.: 09/918,699

(22) Filed: Jul. 30, 2001

(65) Prior Publication Data

US 2003/0021069 A1 Jan. 30, 2003

(51) Int. Cl.[7] .................................................. G11B 5/60
(52) U.S. Cl. ..................................................... 360/234.3
(58) Field of Search ........................ 29/603.09, 603.15; 360/234.3, 235.7, 236.5, 122

(56) References Cited

U.S. PATENT DOCUMENTS

| | | | | |
|---|---|---|---|---|
| 4,739,562 A | * | 4/1988 | Kracke et al. ......... | 360/603.09 |
| 5,023,991 A | * | 6/1991 | Smith ..................... | 29/603.09 |
| 5,095,613 A | * | 3/1992 | Hussinger ............... | 29/603.17 |
| 5,494,473 A | * | 2/1996 | Dupuis .................... | 29/603.09 |
| 5,738,566 A | * | 4/1998 | Li ............................ | 29/603.1 |
| 6,193,584 B1 | * | 2/2001 | Rudy ........................ | 29/593 |

* cited by examiner

*Primary Examiner*—A. J. Heinz
(74) *Attorney, Agent, or Firm*—Lumen Intellectual Property Services, Inc.

(57) ABSTRACT

A slider of a magnetic hard disk drive has one or more electric lapping guides in immediate proximity to the read/write stack of the slider. The lapping guides remain part of the slider during its operation. In the preferred embodiment, two essentially identical lapping guides are symmetrically placed on a slider back. One write head terminal is utilized to conductively access the two lapping guides on one side such that only one additional terminal has to be placed on the slider back together with corresponding leads. The placement of lapping guides on the slider back face provides for an economic lapping of individual sliders with increased precision and reliability regardless of any lapping plane skew.

15 Claims, 3 Drawing Sheets

SLIDER HAVING INTEGRATED LAPPING GUIDES

FIELD OF INVENTION

The present invention relates to sliders used in hard disk drives. In particular, the present invention relates to sliders having integrated lapping guides.

BACKGROUND OF THE INVENTION

A slider is a precisely fabricated part that has to carry magnetic sensors for performing reading and writing operations while flying above rotating disks of a hard disk drive. The ever-increasing data storage densities in hard disk drives require precisely fabricated sliders with well-defined magnetic sensor stripe height and the air-bearing surface possessing flatness and surface finish values in the order of nanometers. Such a level of stripe height control as well as slider flatness and surface finish is crucial for the slider to support a reliable and lasting performance of a hard disk drive.

An important fabrication step in the manufacturing of air bearing surfaces is a lapping process during which the air-bearing surface receives its final flatness and surface finish. During the lapping process material is removed from the tool-cut surface. Lapping guides are utilized to control the amount of removed material so that the magnetic sensor has the precise stripe height at the end of lapping process.

The lapping guide is specifically configured to provide enhanced process information about the lapping process. It is commonly deposited as a thin-film stripe so that there exists a well-defined relationship between the lapping guide height and the magnetic sensor stripe height. A lapping guide is shortened as material is being removed from the air-bearing surface. The lapping guide height, EH, is monitored via its resistance value, R, since they are inversely proportional to each other:

$$EH=K/R.$$

The proportional constant, K, is proportional to the electric resistivity of the lapping guide, the width of the lapping guide, and inversely to the thickness of the lapping guide.

The lapping of the air-bearing surface is commonly performed on the so-called row level at which a number of sliders are arranged in a linear array to compose one work piece. Lapping on the row level allows simultaneous lapping of a number of sliders within a single work piece. The lapping guides used in the prior arts are deposited in the kerf regions between sliders and are to be removed after the lapping process. They are not present in the finished slider bodies.

The even removal of material from each individual slider contained in a work piece is hampered by various factors. Such factors include, for example, internal tension and elastic deformation of the work piece resulting from any mounting, cutting, or lapping induced stress or dimensional tolerances among individual work pieces cut from a wafer. To compensate for these factors and to achieve accurate stripe height control, lapping guides need to be placed in proximity to the magnetic sensors. This patent introduces electric lapping guides that are integrated in each individual slider such that the lapping guide and the magnetic sensor are as close as possible. Such an integrated lapping guide has an additional benefit of increasing the wafer utilization efficiency. Furthermore, each slider body may include more than one lapping guide to cancel any adverse effects on stripe-height variations caused by tolerance in the wafer cutting process or the slider lapping process.

U.S. Pat. No. 5,816,890 to Hao et al., for example, shows a method for wiring a number of lapping guides adjacently placed on a number of sliders contained in a work piece. The work piece is identified as a bar in the patent. The invention addresses the problem of area consumption resulting from the use of lapping guides on the work piece. The area consumption of the lapping guides, peripheral terminals and connecting traces limits the number of sliders that can be fabricated on any given wafer. Hao et al. introduce a wiring configuration that allows to independently recognize the resistance change of individual lapping guides with fewer traces and terminals.

Hao et al. make apparent the dilemma of the commonly used fabrication techniques where an increasing number of lapping guides has to be provided relative to the number of sliders embedded in an work piece in order to meet the increasing demands for lapping accuracy.

Hence, there exists a primary need for providing lapping guides in close proximity to the most critical lapping areas of a slider. On the other hand, there exists also a secondary need for fabrication of closely spaced sliders on a wafer in order to utilize the limited wafer area most efficiently. In view of what is known to those skilled in the art, fulfilling to the primary need may only be accomplished by neglecting the secondary need and vice versa. The present invention allows to comply with the primary need and the secondary need at the same time, as will become apparent from the summary and detailed description below.

SUMMARY

The present invention introduces a slider having one or more integrated lapping guides and a method for lapping individual sliders. In accordance with the invention, sliders can be fabricated in close spacing on a wafer. Furthermore, one or more lapping guides can be placed in close proximity to the most critical lapping area around the read/write stack of the slider. The lapping guide(s) can be built into each slider to compensate for the tolerance in slider geometric variations during processing.

The lapping guide(s) is/are deposited as thin film(s) on the back face of the slider. The slider back is a face perpendicular to the lapped surface. The main functional features for reading and writing of data are fabricated from a number of deposited layers on the slider back face, as is well known in the art.

Sliders are commonly designed in a symmetrical fashion with the read/write stack being placed in the center of the back face. In order to provide high acceleration and deceleration of an operational slider, it is desirable to keep the slider mass and therefore the slider size small. It is merely noted that it serves the purpose of an optimally operating hard disk drive to keep the slider back face small even though additional features may be placed on it. Additional features that are necessary to utilize lapping guides on the slider back are conductive leads and terminals to conductively access the lapping guides.

In order to place and operate lapping guides on the tightly dimensioned slider back, the present invention utilizes slider features fabricated for transmitting signals during operational use of the read or write head. Such features are a terminal and leads conductively connected on one side of the write head.

In the preferred embodiment of the invention, two lapping guides are placed in a symmetric fashion lateral to the read/write stack. Wired in parallel, the two lapping guides share two common terminals. One of these two terminals can be a terminal provided for accessing the write head and only one additional terminal with corresponding leads needs to be provided on the sparsely available area on or around a slider back. As a result, a total resistance of two parallelly-connected lapping guides can be measured between the two terminals. The reciprocal value of this total resistance, R_Total, corresponds to the sum of the reciprocal resistances of each of the two individual lapping guides:

1/R—Total=1/R1+1/R2.

Lapping of work pieces containing a number of air-bearing surfaces is commonly performed in the industry. The present invention allows for lapping of the individual slider rather than a simultaneous lapping of a number of sliders contained in a work piece. Accordingly, the sliders are cut into individual pieces before the lapping is performed. The symmetric arrangement of the lapping guides relative to the read and write elements provides for a precise observation of the removed material height within the most critical lapping area including and surrounding the read and write elements.

In the preferred embodiment two essentially identical lapping guides are connected in parallel electrically. Any mis-alignment of the air-bearing surface due to either slider cutting or non-uniform lapping will cause opposite effects on the reciprocals of resistance value and will not alter the sum of the reciprocals. As a consequence, the end-point accuracy during the lapping of the relevant areas of the air-bearing surface may be provided regardless eventual skew of the lapping plane relative to the slider. This is, because the conductive bridging of the two symmetrically placed lapping guides compensates for any variations in material remaining from one lapping guide relative to the other. Variations of material remaining occur, where the lapping is unevenly performed due to a skew of the dedicated lapping area of the slider relative to a lapping plane defined by the lapping apparatus as is well known to those skilled in the art. The placement of lapping guides on the slider back face provides for an economic lapping with increased precision and reliability regardless of any lapping plane skew or clamping imprecision due to the relatively small size of individual sliders.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
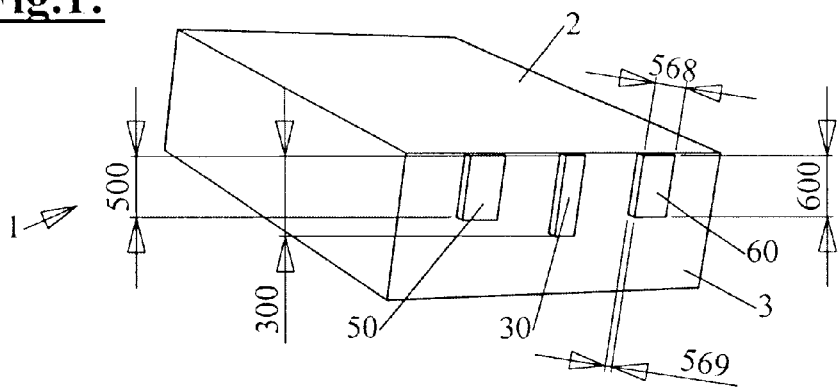
FIG. 1 shows a simplified slider in perspective view.

FIG. 1 shows a perspective view of a simplified slider 1 in an exemplary configuration before a lapping process. The slider 1 has an air-bearing surface 2, as is well known to those skilled in the art. Even though the air-bearing surface 2 is shown as a planar surface, it may have any geometrical shape for providing the function of an air-bearing surface. Moreover, it is noted that the scope of the invention is not limited to any particular shape of the air-bearing surface. The slider 1 is further shown with the slider back 3 on which well-known functional features for performing reading and/or writing operations may be fabricated. Such functional features include a read/write stack as represented by the yoke 30, conductive leads 101–104 (see FIG. 4) and terminals 111–114 (see FIG. 4).

Functional features for performing well-known reading and/or writing operations are complicated structured and fabricated on top of each other. Hence, the functional features of the slider 1 are represented in the FIGS. 1–4 by the yoke 30,31,32.

According to the scope of the preferred embodiment, a first lapping guide 50 and a second lapping guide 60 are positioned on either side of the yoke 30. The lapping guides 50, 60 are defined by height 600, a width 569 and a length 568. The lapping guides 50, 60 are shown as being deposited on the very top of the slider back 3. Nevertheless, the lapping guides 50, 60 may be deposited at any other level or they may be deposited at different levels; as long as they are wired in parallel. Moreover, the level at which the lapping guides are deposited may be selected in correspondence with the lateral extension of various features lateral extension.

Dual lapping guides may be provided with dissimilar materials or constructions as long as they are connected in parallel. In an alternate embodiment of the present invention, the read head itself is utilized to perform as a lapping guide.

A number of functional layers of the read/write stack represented by the yoke 30 are exposed at the air-bearing surface 2. The functional layers are able to induce and measure a magnetization on the disk surface for the purpose of writing and reading data, as is well known to those skilled in the art. The functional layers are represented in simplified form by the yoke 30 having the stack height 300. The stack height 300 is a simplified representation of all individual heights of functional layers affected by the lapping process. It is clear to one skilled in the art that functional elements of a slider may have varying geometric or spatial configurations and that the scope of the invention is in no way limited by or to specific geometric or spatial configuration of individual or all functional features of a slider as used in hard disk drives.

Figure 2:
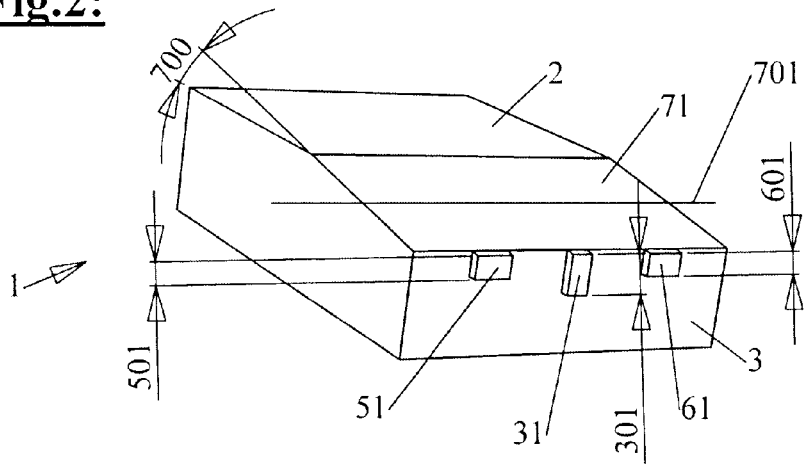
FIG. 2 shows the simplified slider of FIG. 1 exposed to an ideal lapping within a balanced lapping plane.

FIG. 2 illustrates the slider 1 with an ideal lapping process applied to. An ideal lapping process is performed when the lapping plane 71 is perpendicular to the symmetry plane 999 (see FIG. 5). The symmetry plane 999 is introduced in the FIG. 5 and referred to solely for the purpose of general understanding. The symmetry plane 999 may be considered being perpendicular to the surface 6 of the hard disk 8 while passing through the mid-plane of the read sensor 30 as exemplarily illustrated in FIG. 5.

The lapping guides 50, 60 are positioned correspondingly to the functional layers such that material removed from the functional layers may be correspondingly removed from the lapping guides 50, 60. In an ideal lapping process, lapping guides 50, 60 and the functional layers are simultaneously reduced to their heights 501, 601 and 301 at the same rates. In context with the formulas presented below, denote the lapping guides remaining heights as EH1' and EH2' for 501 and 502, respectively. Further, assume the remaining height of the stripe height 31 is SH0. The initial height difference between lapping guide and stripe is D. Thus, the yoke 31 represents the functional layers after an ideal lapping process. The same applies for lapping guides 51, 61, which represent the lapping guides 50, 60 after an ideal lapping process. Since 501, or EH1', is equal to 601, or EH2', the resulting resistances within first and second lapping guides are equal. Hence, in an ideal lapping process only one lapping guide may be utilized to derive information about the remaining material height of the functional layers. In such an ideal lapping condition, the total resistance, R'_Total, is expressed as:

$$R'\_Total = K/(2*SH0 - 2*D).$$

An ideal lapping plane 71 is shown in FIG. 2 with the decline angle 700 relative to the air-bearing surface 2. In the case, where lapping guides 50, 60 and the functional layers are in essentially equal distance to a tilt axis 701 of a lapping plane, the decline angle 700 is insignificant in determining the remaining material height of the functional layers.

Figure 3:
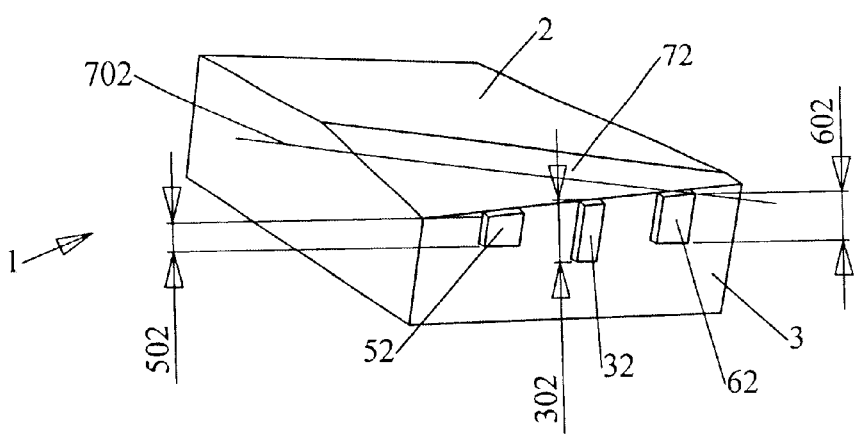
FIG. 3 shows the simplified slider of FIG. 1 exposed to a skewed lapping within a skewed lapping plane.

FIG. 3 illustrates in simplified form the slider 1 resulting from a lapping process performed within a skewed lapping plane 72 where the tilt axis 702 may not be perpendicular to the symmetry plane 999. In this case, the lapping guides 50, 60 and the functional layers may be in varying distance to the tilt axis 702. Consequently, the remaining material height varies between first and second lapping guides. Since the functional layers are in the middle between first and second lapping guides, the removed material height of the functional layers may be the average of the varying remaining material heights of first and second lapping guide.

In such a skewed lapping condition, the total resistance, R"_Total, can be shown to be expressed as:

$$R''\_Total = K/(2*SH0 - 2*D)$$

In other words, the total resistance in a skewed lapping, R"_Total, remains the same as that in an ideal lapping process, R"_Total.

This balancing effect is utilized to conductively connect the lapping guides by introducing at least one additional terminal to the number of terminals necessary to perform reading and/or writing operations by the slider 1. This will be explained under FIG. 4.

The scope of the invention is not limited to the amount of decline angle 700 and orientation of the tilting axis 701, 702. Moreover, the lapping plane may be inclined rather than decline. Also the orientation of the tilting axis may be the result of variances during the fabrication of the sliders or the result of clamping inconsistencies in the fixtures used to fixate the slider during the lapping process.

An example for fabrication variances are slider width discrepancies due to inconsistent cutting operation. A slider with the approximate width of 1 mm exposed to a cutting operation that results in a 1_m asymmetry relative to the symmetry plane 999 may result in a height deviation of up to 150 nm between first and second lapping guides that are 150_m apart.

The lapping guides 50, 60 are electrical lapping guides. They are made from resistive material similar as used in conventional electric lapping guides.

Figure 4:
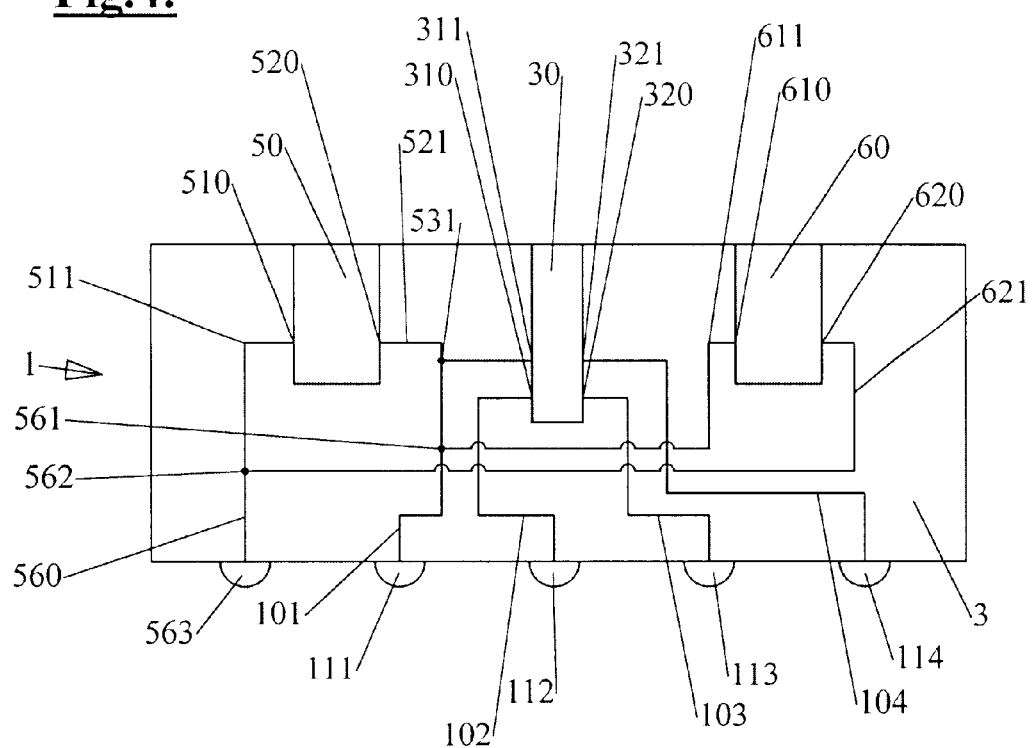
FIG. 4 shows a simplified slider back having two lapping guides.

FIG. 4 shows a more detailed view onto the slider back 3 with simplified leads 560, 101–104 and simplified terminals 563, 111–114 in accordance with the preferred embodiment of the invention. Terminals 111–114 represent the number of terminals necessary to perform reading and writing operations of slider 1. Nevertheless, the scope of the invention is not limited to a particular number of terminals placed on a slider required for its operational use or for performing any other function as is known to those skilled in the art.

The terminal 111 may be a terminal for connecting a cable via the conductive lead 101 to the write head of the slider. The lapping guides 50 and 60 may both be conductively connected via the connections 531, 561 to lead 101 on one of their first connecting ends 520, 610. Preferably opposing to the connecting ends 520, 610 are the second connecting ends 510, 620, which conductively connect via the connection 562 to the lead 560 and ultimately to the terminal 563. Terminals and leads utilized for the read head remain unaffected. It is clear to one skilled in the art that the exemplary illustration of FIG. 4 may be altered in many ways without departing from the scope of the invention.

During the lapping, a current may be applied between the terminals 563 and 111 and an initial voltage may be measured in accordance to the combined resistance. The leads 560, 101 and any other resistive elements along the path from the terminals 563, 111 towards and away from the lapping guides 50, 60 may have a known resistance that remains constant during the lapping process. Preferably, a first path resistance of the lead segments 511 plus 521 corresponds to a second path resistance of the lead segments 611 plus 621.

As the lapping process progresses, material is removed in an unknown proportion between 50 and 60. The lapping guides 50, 60 increase their resistance in inverse proportion to their reduction of height. In addition, first and second path resistance is equal as well. As a result, the proportion between the remaining material of first and second lapping guides 52, 62 needs not to be known in order to determine the actual stripe height 301 of 31.

Figure 5:
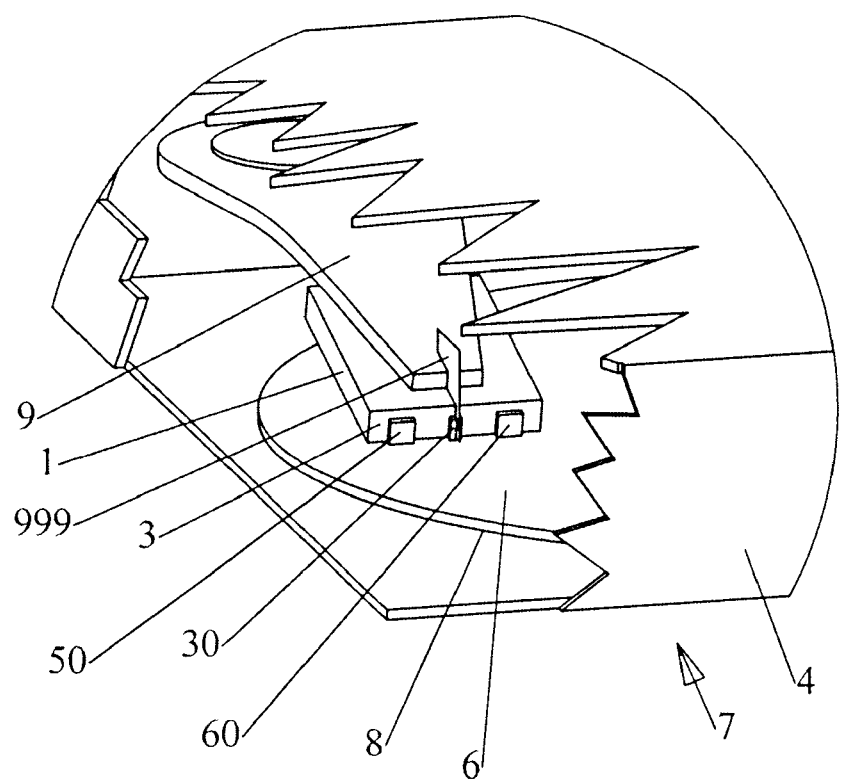
FIG. 5 shows a fragmental view of a hard disk drive with a slider visible through a removed section of a housing portion.

FIG. 5 shows a fragmental view of a hard disk drive 7. Through a removed section of the hard disk drive housing 4 a simplified slider arm 9 is shown holding the slider 1. FIG. 5 shows how the slider 1 with its symmetry plane 999 is placed relative to the disk surface 6 of a hard disk drive 8.

Accordingly, the scope of the invention disclosed in the specification above, is set forth by the following claims and their legal equivalent:

What is claimed is:

1. An operational slider for a hard disk drive comprising two resistive lapping guides substantially symmetrically and laterally positioned relative to a read-write stack centrally placed on a back face of said slider, wherein said lapping guides are conductively connected to a read or write head terminal.

2. The slider of claim 1, wherein said slider comprises a number of read/write terminals and one lapping guide terminal.

3. The slider of claim 2, wherein at least one of said lapping guides is conductively connected to a read or write head terminal.

4. The slider of claim 1, wherein said lapping guides are conductively connected.

5. The slider of claim 1, wherein said lapping guides are conductively connected in parallel.

6. A hard disk drive comprising a slider comprising two resistive lapping guides substantially symmetrically and laterally positioned relative to a read-write stack centrally placed on a back face of said slider, wherein said lapping guides are conductively connected to a read or write head terminal.

7. The disk drive of claim 6, wherein said lapping guides are conductively connected.

8. The disk drive of claim 6, wherein said lapping guides are conductively connected in parallel.

9. The disk drive of claim 6, wherein said slider comprises a number of read/write terminals and one lapping guide terminal.

10. The disk drive of claim 9, wherein said lapping guides are conductively connected to a read or write head terminal.

11. A computer comprising a hard disk drive comprising a slider comprising two resistive lapping guides substantially symmetrically positioned relative to a read-write stack centrally placed on a back face of said slider, wherein said lapping guides are conductively connected to a read or write head terminal.

12. The computer of claim 11, wherein said lapping guides are conductively connected.

13. The computer of claim 11, wherein said lapping guides are conductively connected in parallel.

14. The computer of claim 11, wherein said slider comprises a number of read/write terminals and one lapping guide terminal.

15. The computer of claim 14, wherein said lapping guides are conductively connected to a read or write head terminal.

* * * * *